Patented June 23, 1953

2,643,232

UNITED STATES PATENT OFFICE 2,643,232

POLYMERIC DIGUANIDES

Francis Leslie Rose and Geoffrey Swain, Blackley, Manchester, England, assignors to Imperial Chemical Industries Limited, a corporation of Great Britain No Drawing. Application August 14, 1950, Serial No. 179,368. In Great Britain August 22, 1949

9 Claims. (Cl. 260—2)

This invention relates to new polymeric substances and more particularly it relates to new polymeric diguanides and their salts which possess good antibacterial and antifungal properties.

According to the invention we provide the said new polymeric substances which in the form of their free bases are linear polymeric substances in which the recurring unit is represented by the formula:

—X—NH—C—NH—C—NH—Y—NH—C—NH—C—NH—
     ‖      ‖              ‖      ‖
     NH     NH             NH     NH wherein X and Y stand for bridging groups in which together the total number of carbon atoms directly interposed between the adjacent nitrogen atoms is greater than 9 and smaller than 17.

The said bridging groups may consist of polymethylene chains, which optionally may be interrupted, as by oxygen or sulphur atoms, and also they may incorporate cyclic nuclei which themselves may be saturated or unsaturated. The number of carbon atoms directly interposed between the nitrogen atoms when the groups X and/or incorporate a cyclic group or groups includes those in that segment of the cyclic group or groups which is the shortest. Thus the number of carbon atoms directly interposed between the nitrogen atoms in the group:

—NH—CH$_2$—O—⟨⟩—O—CH$_2$—NH— is 6 and not 8, and the number of carbon atoms directly interposed between the nitrogen atoms in the group:

—NH—CH$_2$—O   O—CH$_2$—NH— is 4 and not 6 nor 8.

We have found that the said new polymeric substances possess good antibacterial activity for example against Streptococcus spp., against Staphylococcus spp., against *Bacillus coli*, against *Clostridium welchii* and, moreover, against *Pseudomonas pyocyanea*. In addition we have found that they strongly inhibit the growth of many fungi, for example of *Fusarium gramineorum*, *Phythium ultimum* and *Aspergillus niger*.

Of the polymeric substances of this invention we have found that those in which the total number of carbon atoms directly interposed between the adjacent nitrogen atoms in the above formulated recurring unit is between 11 and 15 are especially of value on account of their antibacterial and antifungal properties and in particular we have found polymeric hexamethylene diguanide to possess these properties to a notable degree.

According to a further feature of the invention we manufacture the said new polymeric substances by a process which comprises reacting a bisdicyandiamide of the formula

CN—NH—C—NH.X.NH—C—NH—CN
         ‖              ‖
         NH             NH with a diamine of the formula

NH$_2$—Y—NH$_2$

The two components are conveniently brought into reaction by heating together, the diamine being preferably used in the form of a salt thereof, preferably at temperatures between 100° C. and 170° C., either alone, or in the presence of a neutral medium.

According to yet a further feature of the invention we provide a process for the manufacture of those of the said new polymeric substances in the structure of which X and Y are identical by a process which comprises interaction of equimolecular proportions of dicyanimide and a diamine of the formula

NH$_2$—X—NH$_2$ the diamine being preferably in the form of a salt.

The polymeric diguanides of this invention are freely soluble in water in the form of their salts giving nearly neutral solutions. They are characterised by giving sparingly soluble copper derivatives.

The invention is illustrated but not limited by the following examples in which the parts are by weight.

*Example 1*

19 parts of hexamethylenediamine dihydrochloride and 25 parts of hexamethylene bis-dicyandiamide are ground together and the mixture is stirred and heated at 145°–150° C. for 6 hours. It is then cooled and the residue is obtained as a brittle, hydroscopic transparent resin which softens at 70–80° C. and melts from 100°–110° C. It is readily soluble in water and when ammoniacal copper sulphate is added to the aqueous solution there is obtained a pink-mauve water-insoluble copper derivative. The water-soluble resin obtained in this way is the hydrochloride of the polymeric diguanide.

The hexamethylene bis-dicyandiamide used in the above example may be prepared in the following manner:

1 part of hexamethylenediamine dihydrochloride and 1 part of sodium dicyanimide are powdered together and stirred with 8 parts of butanol under reflux in a bath kept at 130°–135° C. The mixture is then cooled and filtered and the residue is crystallised from water. Hexamethylene bis-dicyandiamide is obtained as a colourless, microcrystalline solid, melting at 202–203° C.

*Example 2*

25 parts of hexamethylene-bis-dicyandiamide and 14.7 parts of trimethylenediamine dihydrochloride are finely powdered together and the mixture is stirred and heated at 150° C. for 4 hours. It is then cooled and the residue is a hygroscopic, almost colourless, water-soluble, very viscous gum, which gives an insoluble mauve-pink copper derivative. This gum is the hydrochloride of the polymeric diguanide.

*Example 3*

25 parts of hexamethylene-bis-dicyandiamide and 25 parts of decamethylenediamine dihydrochloride are finely powdered together and the mixture is stirred and heated at 145–150° C. for 3 hours. The cooled product is a colourless hygroscopic resin, readily soluble in water. It gives an insoluble mauve copper derivative.

*Example 4*

25 parts of hexamethylene bis-dicyandiamide and 20.5 parts of bis-ω-aminopropyl ether dihydrochloride are finely powdered and the mixture is stirred and heated to 150° C. for 4 hours. The mixture is then cooled and the polymeric diguanide salt so obtained is an almost colourless soft resin, hydroscopic and readily soluble in water. The mauve pink copper derivative is insoluble in water.

*Example 5*

25 parts of hexamethylene bis-dicyandiamide and 28.3 parts of 4:4'-diaminodicyclohexylmethane dihydrochloride (a mixture of cis-cis and cis-trans isomers) are finely powdered together and the mixture is heated at 160° C. for 5 hours. It is then cooled and the product is a brittle, colourless, glass. The diguanide salt thus obtained dissolves in water giving a slightly opalescent solution. It forms an insoluble pink copper derivative. In the same manner a polymeric diguanide salt is obtained from a mixture of the trans isomers of 4:4'-diaminodicyclohexylmethane dihydrochloride and hexamethylene bis-dicyandiamide. It is a brittle resin, soluble in water to give a somewhat opalescent solution. It forms a pink insoluble copper derivative.

*Example 6*

25 parts of hexamethylene bis-dicyandiamide and 30 parts of 4:4'-di-(ω-aminopropoxy)benzene dihydrochloride are finely powdered together and the mixture is stirred and heated at 165°–170° C. for 3 hours. It is then cooled and the residue is the polymeric diguanide salt as a brittle light brown resin soluble in water. It forms an insoluble mauve-pink copper derivative.

*Example 7*

25 parts of hexamethylene bis-dicyandiamide and 20.3 parts of 1:3-bis-methylaminoneopentane dihydrochloride are finely powdered together and the mixture is heated at 140–145° C. for 3 hours. It is then cooled and the resulting polymeric diguanide salt is a colourless water-soluble hygroscopic gum. It forms an insoluble copper derivative.

*Example 8*

21.8 parts of trimethylene-bis-dicyandiamide (M. P. 180–182° C. with decomposition, made by a method similar to that used in making hexamethylene bis-dicyandiamide—see Example 1) and 14.7 parts of trimethylenediamine dihydrochloride are powdered together and the mixture is stirred and heated at 150° C. for 75 minutes. It is then cooled and the polymeric diguanide salt so obtained is a colourless hygroscopic resin. It is readily soluble in water and gives an insoluble copper derivative.

*Example 9*

30.6 parts of decamethylene-bis-dicyandiamide, (M. P. 184–186° C.), prepared by a method similar to that used in making hexamethylene-bis-dicyandiamide (see Example 1) and decamethylenediamine dihydrochloride are finely powdered and the mixture is heated at 145–150° C. for 3 hours. It is then cooled and the polymeric diguanide salt is thus obtained as a brittle, slightly opalescent resin. It dissolves in water and forms an insoluble copper derivative.

*Example 10*

30.6 parts of decamethylene-bis-dicyandiamide and 14.7 parts of trimethylenediamine dihydrochloride are finely powdered together and the mixture is heated at 145–150° C. for 8 hours. It is then cooled and the colourless hygroscopic gum so obtained is soluble in water and forms an insoluble copper derivative.

*Example 11*

26.6 parts of bis-1-(cyanoguanidino)-3-propyl ether (M. P. 138–140° C., made by a method similar to that used in making hexamethylene-bis-dicyandiamide—see Example 1) and 20.5 parts of bis-(1-amino-3-propyl)-ether dihydrochloride are finely powdered together and the mixture is stirred and heated at 140–145° C. for 150 minutes. It is then cooled and the polymeric diguanide salt so obtained is a soft, hygroscopic resin readily soluble in water and it gives an insoluble copper derivative.

*Example 12*

35.8 parts of 1:4-di-(ω-cyanoguanidino-propoxy)-benzene, M. P. 204–206° C. (made by a method similar to that used in making hexamethylene - bis - dicyandiamide—see Example 1) and 29.7 parts of 1:4-di-(ω-aminopropoxy) benzene dihydrochloride are finely powdered together and the mixture is heated at 165–170° C. for 2 hours. It is then cooled and then consists of a light brown glass which is the polymeric diguanide salt. It is soluble in water and gives an insoluble copper derivative.

What we claim is:

1. Polymeric substances which in the form of their free bases are linear polymeric substances in which the recurring unit is represented by the formula

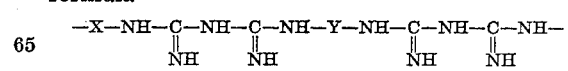

wherein X and Y stand for bridging groups which comprise polymethylene chains and are free of reactive substituents and in which together the total number of carbon atoms directly interposed between the adjacent nitrogen atoms is greater than 9 and smaller than 17.

2. Polymeric substances as claimed in claim 1 wherein the total number of carbon atoms directly interposed between the adjacent nitrogen atoms is greater than 11 and smaller than 15.

3. Polymeric hexamethylene diguanide.

4. Process for the manufacture of the polymeric substances claimed in claim 1 which comprises heating a bisdicyandiamide of the formula:

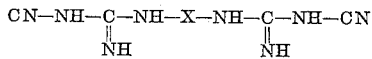

with a diamine of the formula

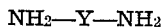

wherein X and Y have the meaning stated in claim 1.

5. Process for the manufacture of those polymeric substances claimed in claim 1 in the structure of which X and Y are identical which comprises heating together equimolecular proportions of dicyanimide and a diamine of the formula $NH_2$—X—$NH_2$.

6. Process for the manufacture of the polymeric substances which in the form of their free bases are linear polymeric substances in which the recurring unit is represented by the formula:

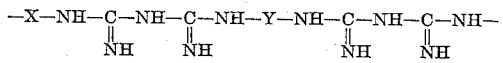

wherein X and Y stand for bridging groups which comprise polymethylene chains and are free of reactive substituents and in which together the total number of carbon atoms directly interposed between the adjacent nitrogen atoms is greater than 9 and smaller than 17, which comprises heating a bisdicyandiamide of the formula:

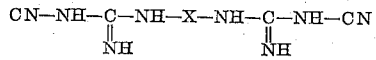

with a diamine of the formula:

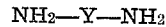

wherein X and Y have the meaning stated above, the diamine being used in the form of a salt thereof.

7. Process of claim 6, wherein said reaction is carried out at a temperature between 100° C. and 170° C.

8. Process of claim 6, wherein the diamine is hexamethylene diamine which is employed in the form of hexamethylenediamine dihydrochloride.

9. Process of claim 6, wherein the bisdicyandiamide is hexamethylene-bis-dicyandiamide.

FRANCIS LESLIE ROSE.
GEOFFREY SWAIN.

References Cited in the file of this patent

UNITED STATES PATENTS

| Number | Name | Date |
|---|---|---|
| 2,325,586 | Bolton et al. | Aug. 3, 1943 |
| 2,474,909 | Olpin et al. | July 5, 1949 |